(12) United States Patent
Hiratsuka

(10) Patent No.: US 12,202,544 B2
(45) Date of Patent: Jan. 21, 2025

(54) VEHICLE FRAME STRUCTURE

(71) Applicant: Honda Motor Co., Ltd., Tokyo (JP)

(72) Inventor: Kuruto Hiratsuka, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 211 days.

(21) Appl. No.: 17/988,762

(22) Filed: Nov. 17, 2022

(65) Prior Publication Data
US 2023/0219624 A1 Jul. 13, 2023

(30) Foreign Application Priority Data

Jan. 10, 2022 (CN) .......................... 202210021645.8

(51) Int. Cl.
*B62D 21/15* (2006.01)
*B62D 21/11* (2006.01)

(52) U.S. Cl.
CPC ............ *B62D 21/155* (2013.01); *B62D 21/11* (2013.01)

(58) Field of Classification Search
CPC .............................. B62D 21/155; B62D 21/11
See application file for complete search history.

(56) References Cited

U.S. PATENT DOCUMENTS

| | | | | |
|---|---|---|---|---|
| 8,490,988 B2 * | 7/2013 | Takeshita | ............... | B62D 21/11 |
| | | | | 280/124.109 |
| 9,394,002 B2 * | 7/2016 | Uicker | ................. | B23K 20/129 |
| 10,112,651 B2 * | 10/2018 | Takeda | ................. | B62D 25/082 |
| 10,717,468 B2 * | 7/2020 | Hara | ..................... | B62D 21/152 |
| 11,584,443 B2 * | 2/2023 | Anzai | .................... | B62D 27/02 |
| 2022/0204087 A1 * | 6/2022 | Anzai | .................. | B62D 21/155 |

FOREIGN PATENT DOCUMENTS

JP 5879205 3/2016

* cited by examiner

*Primary Examiner* — Jason D Shanske
*Assistant Examiner* — Joselynn Y Sliteris
(74) *Attorney, Agent, or Firm* — JCIPRNET

(57) ABSTRACT

The disclosure provides a vehicle frame structure capable of achieving light weight and cost reduction while maintaining good structural rigidity. A vehicle frame structure includes a side frame and a support frame. The side frame is disposed at a side portion of a vehicle and extends in a vehicle front-rear direction. The support frame is disposed below the side frame to support a suspension member and includes a body portion, an arm portion extending upwards from the body portion, and a fixing portion disposed on an upper end of the arm portion. The fixing portion of the support frame and a lower end of the side frame are fixed to each other via a fastening member extending in a vehicle up-down direction. The fixing portion has a slit formed towards the outside in a vehicle width direction from a through hole into which the fastening member is inserted.

3 Claims, 5 Drawing Sheets

VEHICLE FRAME STRUCTURE

CROSS-REFERENCE TO RELATED APPLICATION

This application claims the priority benefit of China application no. 202210021645.8, filed on Jan. 10, 2022. The entirety of the above-mentioned patent application is hereby incorporated by reference herein and made a part of this specification.

BACKGROUND

Technical Field

The disclosure relates to a vehicle frame structure.

Description of Related Art

In the related art (Japanese Patent No. 5879205), in order to improve the energy efficiency of a vehicle as a moving body and improve the traffic safety of the vehicle, it is expected that the weight of the vehicle body structure of the vehicle can be lowered and the vehicle body structure has good structural rigidity. Regarding the vehicle body structure of a vehicle, in addition to the main part of the vehicle body, support frames (or sub frames) used to support vehicle devices such as the suspension system are also provided most of the time. In addition, a side frame extending in the front-rear direction of the vehicle is also provided on the side portion of the vehicle to suppress the impact on the side portion when the vehicle collides. Typically, the upper end of the support frame of the vehicle is provided with an additional bracket. The bracket is fixed to the upper end of the support frame via a fixing member (e.g., a bolt, etc.) and is also fixed to the lower end of the side frame. Accordingly, the support frame of the vehicle is connected to the lower end of the side frame via the additional bracket, and the support frame can support the upper side frame in the vehicle up-down direction.

Herein, as a mechanism for suppressing the impact when the vehicle collides, the bracket is further provided with a notch that opens downwards from the edge of the insertion hole through which the fixing member penetrates. In this way, when the vehicle collides, the fixing member for fixing the support frame and the bracket can break the notch on the bracket and allow the support frame to be displaced downwards. As such, the support frame and the bracket are separated in the vehicle up-down direction. In such an arrangement, the support frame is often made of aluminum to improve rigidity, so the bracket fixed to the support frame is required to be made of iron to improve rigidity in order to support the fixing member. As a result, the number of parts of these frame structures increases, and the overall weight increases. Moreover, these frame structures are displaceable in the vehicle up-down direction, and the overall rigidity still needs to be improved.

SUMMARY

The disclosure provides a vehicle frame structure including a side frame and a support frame. The side frame is disposed at a side portion of a vehicle and extends in a vehicle front-rear direction. The support frame is disposed below the side frame to support a suspension member. The support frame includes a body portion, an arm portion extending upwards from the body portion, and a fixing portion disposed on an upper end of the arm portion. The fixing portion of the support frame and a lower end of the side frame are fixed to each other via a fastening member extending in a vehicle up-down direction. The fixing portion has a slit formed towards the outside in a vehicle width direction from a through hole into which the fastening member is inserted.

In order to make the aforementioned and other features and advantages of the invention more comprehensible, several embodiments accompanied with figures are described in detail below.

DESCRIPTION OF THE EMBODIMENTS

The disclosure provides a vehicle frame structure capable of achieving light weight and cost reduction while maintaining good structural rigidity.

The disclosure provides a vehicle frame structure including a side frame and a support frame. The side frame is disposed at a side portion of a vehicle and extends in a vehicle front-rear direction. The support frame is disposed below the side frame to support a suspension member. The support frame includes a body portion, an arm portion extending upwards from the body portion, and a fixing portion disposed on an upper end of the arm portion. The fixing portion of the support frame and a lower end of the side frame are fixed to each other via a fastening member extending in a vehicle up-down direction. The fixing portion has a slit formed towards the outside in a vehicle width direction from a through hole into which the fastening member is inserted.

In an embodiment of the disclosure, the slit is configured so that the fastening member is able to be detached to the outside in the vehicle width direction when the vehicle collides in the front or in the rear.

In an embodiment of the disclosure, a width of the slit in the vehicle front-rear direction is larger than a width of a shaft portion of the fastening member inserted into the through hole in the vehicle front-rear direction.

In an embodiment of the disclosure, the support frame and the fixing portion are integrally formed by casting.

To sum up, in the vehicle frame structure provided by the disclosure, the fixing portion at the upper end of the support frame and the lower end of the side frame are fixed to each other via the fastening member extending in the vehicle up-down direction. Further, the fixing portion has the slit formed towards the outside in the vehicle width direction from the through hole into which the fastening member is inserted. In this way, when the vehicle collides, the fastening member for fixing the support frame and the side frame can be displaced towards the outside in the vehicle width direction from the slit in the fixing portion. The support frame and the side frame are separated in the vehicle width direction, so an additional bracket is not required to be used to connect and fix the support frame and the side frame. The overall structural rigidity (especially in the vehicle up-down direction) is also improved. Accordingly, the vehicle frame structure provided by the disclosure can achieve light weight and cost reduction while maintaining good structural rigidity.

Figure 1:
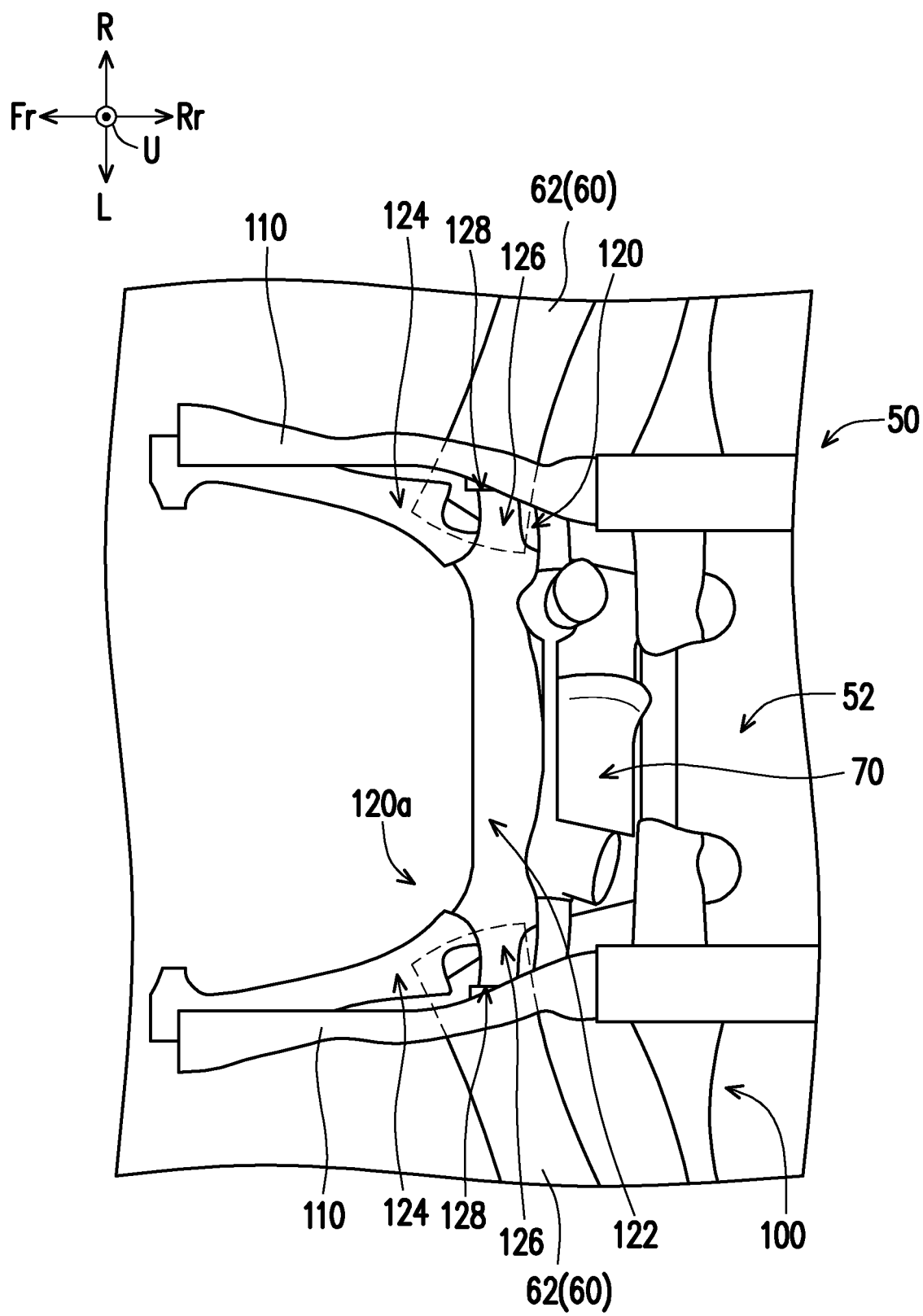
FIG. 1 is schematic top view of a vehicle frame structure applied to a vehicle according to an embodiment of the disclosure.
Figure 2:
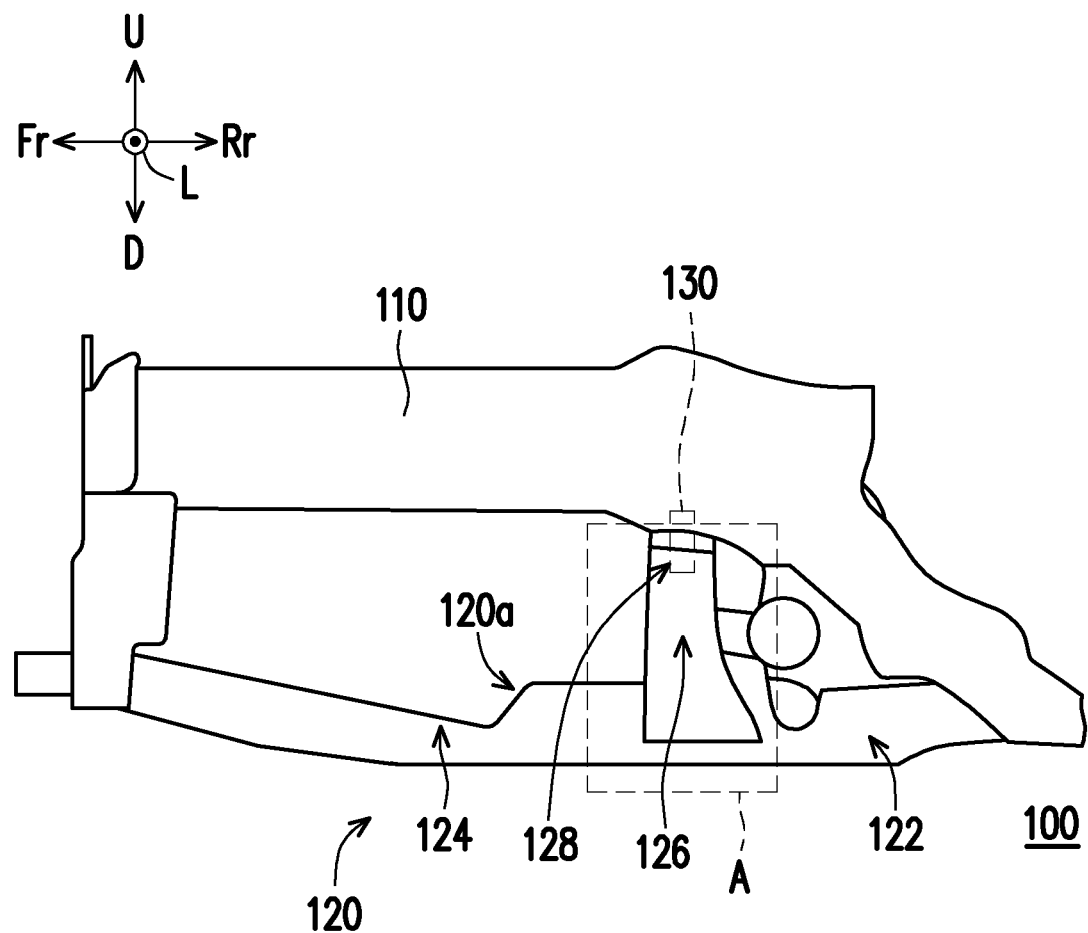
FIG. 2 is a schematic side view of the vehicle frame structure shown in FIG. 1.
Figure 3:
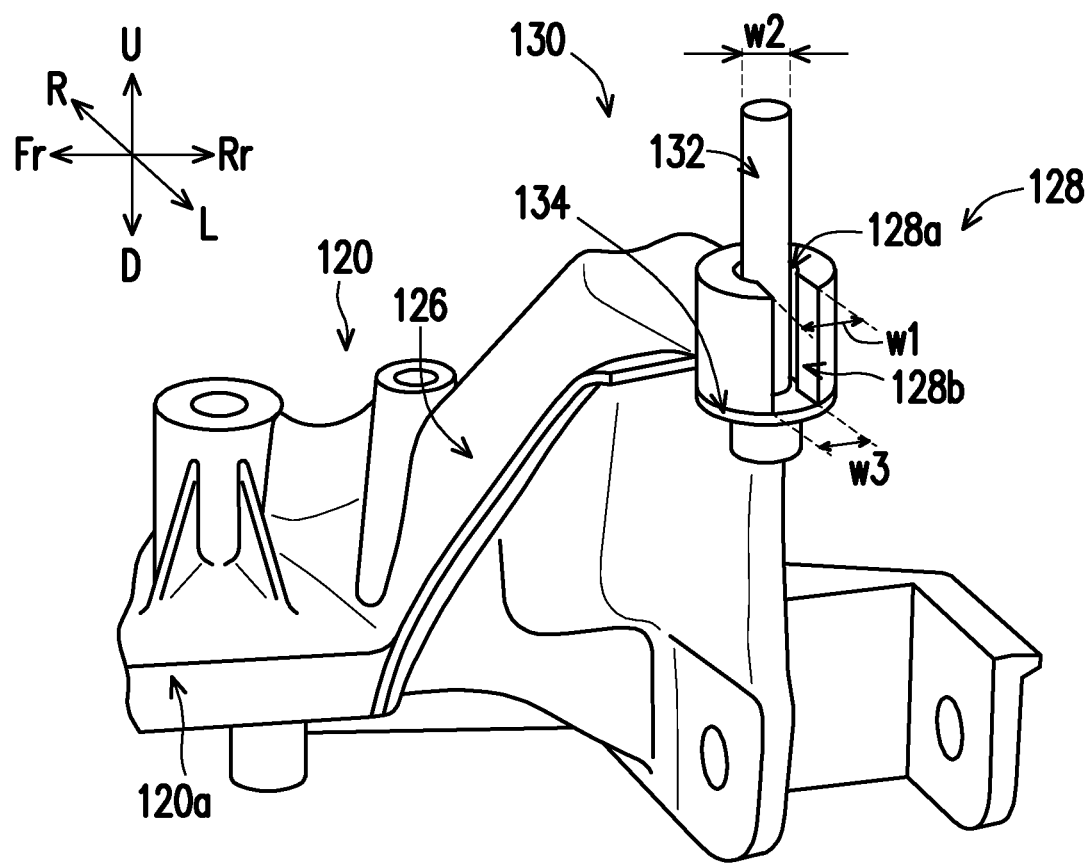
FIG. 3 is a schematic three-dimensional view of the vehicle frame structure shown in FIG. 2 in region A.
Figure 4:
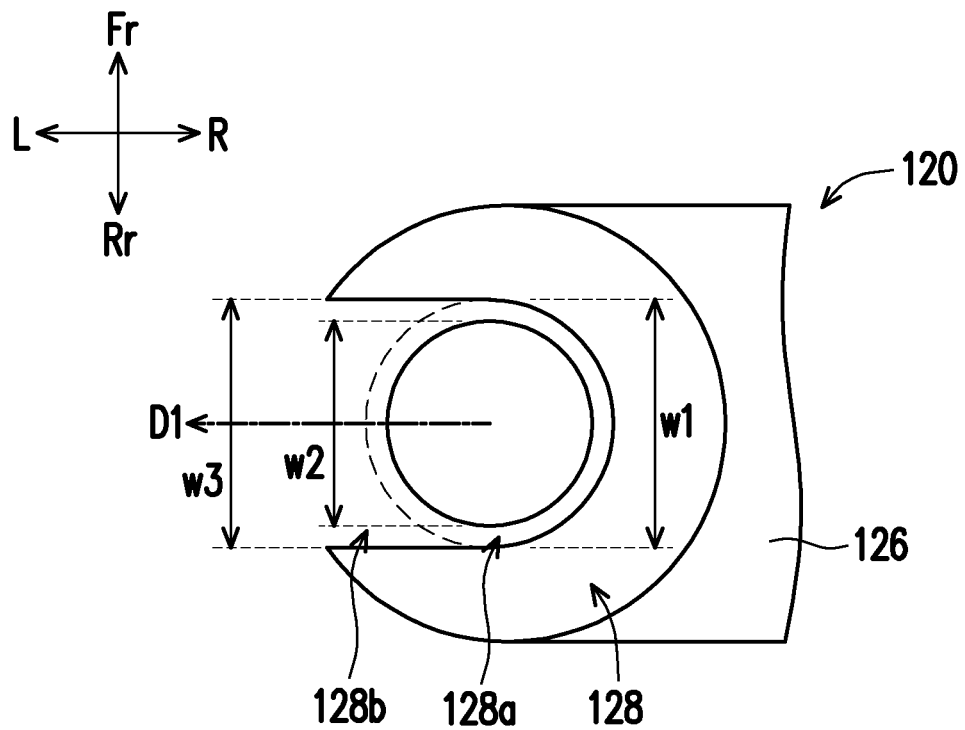
FIG. 4 is a schematic top view of a fixing portion and a fastening member used in the vehicle frame structure shown in FIG. 3.
Figure 5:
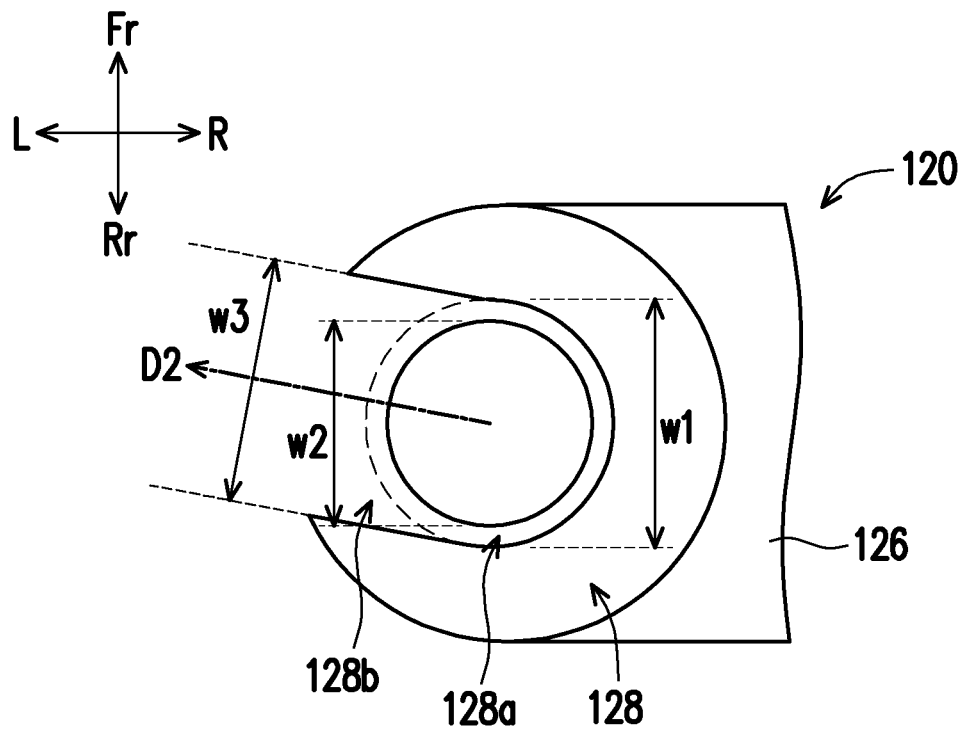
FIG. 5 and FIG. 6 are schematic top views of the fixing portion and the fastening member used in the vehicle frame structure shown in FIG. 4 in other variation examples.
Figure 6:
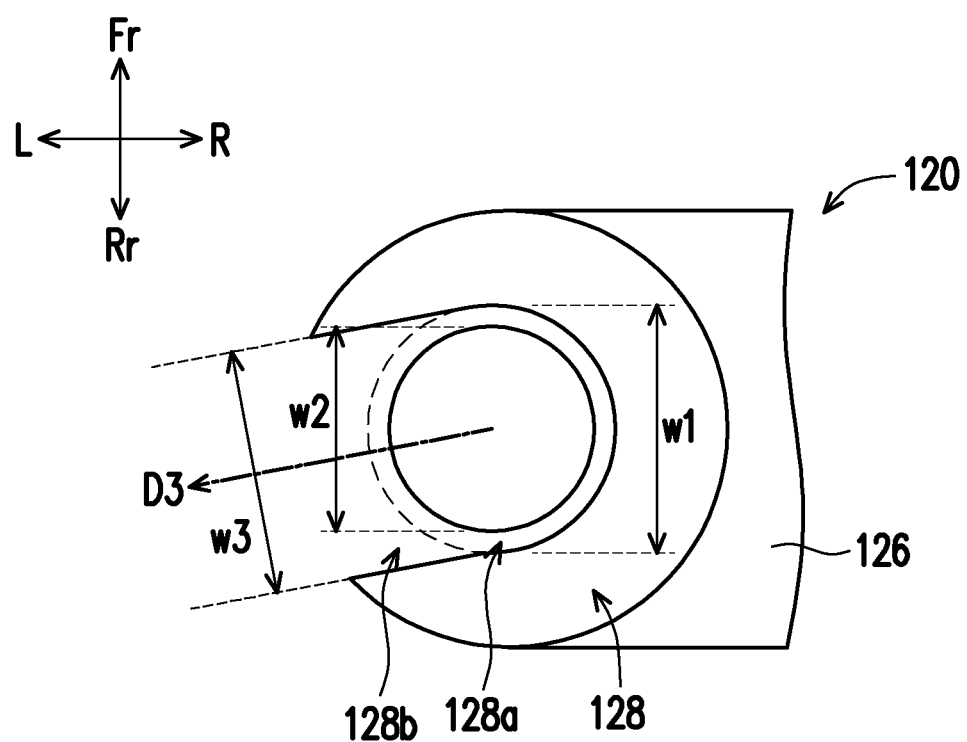

Descriptions of the disclosure are given with reference to the exemplary embodiments illustrated by the accompanying drawings. FIG. 1 is schematic top view of a vehicle frame structure applied to a vehicle according to an embodiment of the disclosure. FIG. 2 is a schematic side view of the vehicle frame structure shown in FIG. 1. FIG. 3 is a schematic three-dimensional view of the vehicle frame structure shown in FIG. 2 in region A. FIG. 4 is a schematic top view of a fixing portion and a fastening member used in the vehicle frame structure shown in FIG. 3. FIG. 5 and FIG. 6 are schematic top views of the fixing portion and the fastening member used in the vehicle frame structure shown in FIG. 4 in other variation examples. The specific structure and the like of a vehicle frame structure 100 of the present embodiment will be described below with reference to FIG. 1 to FIG. 4, and other variation examples of the vehicle frame structure 100 will be described with reference to FIG. 5 and FIG. 6. However, the vehicle frame structure 100 is only one example of the disclosure, and the disclosure is not limited thereto.

With reference to FIG. 1 and FIG. 2, in this embodiment, the vehicle frame structure 100 is adapted to be mounted on the front or rear of a vehicle 50 as a part of a vehicle body 52. Herein, the vehicle frame structure 100 includes a side frame 110 and a support frame 120. The side frame 110 is disposed at a side portion (not shown) of a vehicle and extends in a vehicle front-rear direction (e.g., a vehicle front direction Fr and a vehicle rear direction Rr shown in in FIG. 1 and FIG. 2). The support frame 120 (or a sub frame) is disposed below the side frame 110 and is connected to a part of a suspension member 60 (e.g., a lower arm 62 of the suspension member 60) to support the suspension member 60 (shown in FIG. 1), and an upper end of the support frame 120 and a lower end of the side frame 110 are fixed to each other.

Preferably, a pair of side frames 110 is provided in a vehicle width direction (e.g., a vehicle left direction L and a vehicle right direction R in FIG. 1). Further, the support frame 120 has a horizontal portion 122 extending in the vehicle width direction and a pair of vertical portions 124 extending in the vehicle front-rear direction and is configured such that the horizontal portion 122 is connected between the pair of vertical portions 124 (shown in FIG. 1). In this way, the support frame 120 can support vehicle components such as a steering gear box 70 via the horizontal portion 122, can support the suspension member 60 by connecting a part of the suspension member 60 (e.g., the lower arm 62 of the suspension member 60) via the pair of vertical portions 124, and can connect a pair of side frames 110 via the pair of vertical portions 124. However, the disclosure is not limited thereto, and adjustment can be made according to needs.

Further, in this embodiment, as shown in FIG. 1 and FIG. 2, the support frame 120 includes a body portion 120a (i.e., the aforementioned horizontal portion 122 and the pair of vertical portions 124, but not limited thereto), an arm portion 126 extending upwards (e.g., a vehicle up direction U shown in FIG. 1 and FIG. 2) from the body portion 120a, and a fixing portion 128 disposed at an upper end (i.e., an end portion corresponding to the vehicle up direction U) of the arm portion 126. That is, the horizontal portion 122 and the pair of vertical portions 124 constituting the body portion 120a are positioned at substantially the same level. The arm portion 126 extends upwards from the body portion 120a towards the side frame 110, and the upper end of the arm portion 126 is formed with the fixing portion 128 for connecting with the side frame 110. Preferably, the support frame 120 is provided with a pair of arm portions 126 and a pair of fixing portions 128 in the vehicle width direction (e.g., the vehicle left direction L and the vehicle right direction R in FIG. 1). The pair of fixing portions 128 corresponds to the pair of side frames 110, but is not limited thereto. Accordingly, the fixing portion 128 at the upper end of the support frame 120 and the lower end of the side frame 110 can be fixed to each other via a fastening member 130 extending in a vehicle up-down direction (e.g., a vehicle up direction U and a vehicle down direction D shown in FIG. 2 and FIG. 3). The connection between the side frame 110 on one side and the fixing portion 128 on one side of the support frame 120 will be described below.

To be specific, in this embodiment, as shown in FIG. 3, the fixing portion 128 is formed on the upper end of the arm portion 126 of the support frame 120. Preferably, the support frame 120 and the fixing portion 128 are integrally formed by casting. That is, the support frame 120 may be formed by casting metal materials to obtain the aforementioned body portion 120a, the arm portion 126, and the fixing portion 128. Therefore, the fixing portion 128 is a part of the structure integrally formed at the upper end of the support frame 120 in the vehicle up-down direction. As such, the fixing portion 128 may exhibit good structural rigidity by being formed by casting and may stably support the fastening member 130 in the vehicle up-down direction. Further, an additional bracket is not required to be used to connect and fix the support frame 120 to the side frame 110, and a fixing member (e.g., a bolt, etc.) required to be used to connect the bracket to the support frame 120 is also not needed. Therefore, light weight and cost reduction may be achieved. However, the disclosure is not limited thereto, and adjustment can be made according to needs.

Further, in this embodiment, the fixing portion 128 of the support frame 120 is provided with a through hole 128a. The through hole 128a is, for example, a passage extending in the vehicle up-down direction (e.g., the vehicle up direction U and the vehicle down direction D shown in FIG. 3) and penetrating through the fixing portion 128. The fastening member 130 has a shaft portion 132 and a stopper portion 134. Herein, the through hole 128a is, for example, a circular hole. The shaft portion 132 of the fastening member 130 is, for example, a round rod whose size is smaller than that of the through hole 128a, and the stopper portion 134 is, for example, a bump whose size is larger than that of the through hole 128a. As such, a lower end of the shaft portion 132 of the fastening member 130 is inserted into the through hole 128a to connect the fixing portion 128, and the stopper portion 134 of the fastening member 130 abuts against a lower edge of the fixing portion 128 to restrain the fastening member 130 from moving upwards in the vehicle up-down direction. However, the connection between the lower end of the fastening member 130 and the fixing portion 128 of the support frame 120 may be adjusted according to needs, and the configuration of the shaft portion 132 and the stopper portion 134 is not limited in the disclosure.

Similarly, although not shown in the drawings, the upper end of the fastening member 130 is fixed onto the side frame 110 (e.g., by bolt fixing, welding fixing, etc.) to restrain the movement of the fastening member 130 in the vehicle up-down direction. The fixing of the upper end of the fastening member 130 and the side frame 110 may be adjusted according to needs, and the disclosure is not limited thereto. As such, the fixing portion 128 at the upper end of the support frame 120 and the lower end of the side frame 110 face each other in the vehicle up-down direction, and the fixing portion 128 of the support frame 120 and the side frame 110 may be fixed to each other via the fastening member 130 extending in the vehicle up-down direction.

In addition, in this embodiment, as shown in FIG. 3, the fixing portion 128 of the support frame 120 has a slit 128b formed towards the outside in the vehicle width direction (e.g., the vehicle left direction L and the vehicle right direction R shown in FIG. 3) from the through hole 128a into which the fastening member 130 is inserted. The outside in the vehicle width direction refers to both sides corresponding to the vehicle left direction L and the vehicle right direction R of the vehicle body 52 of the vehicle 50 shown in FIG. 1. For instance, the fixing portion 128 corresponding to the vehicle left direction L shown in FIG. 3 has a slit 128b formed towards the vehicle left direction L from the through hole 128a. Likewise, the fixing portion 128 (not shown) corresponding to the vehicle right direction R has a slit 128b formed towards the vehicle right direction R from the through hole 128a. The slit 128b is, for example, a slot extending in the vehicle up-down direction (e.g., the vehicle up direction U and the vehicle down direction D shown in FIG. 3) and penetrating through the fixing portion 128. Further, the slit 128b is formed from an edge of the through hole 128a towards the outside in the vehicle width direction. Therefore, the through hole 128a and the slit 128b form a structure that is open towards the outside of the fixing portion 128. The slit 128b is configured so that the fastening member 130 is able to be detached to the outside in the vehicle width direction when the vehicle 50 collides in the front or in the rear. In this way, the fastening member 130 is fixed in the vehicle up-down direction to provide good structural rigidity. The fastening member 130 can move outwards in the vehicle width direction, so as to be detached to the outside in the vehicle width direction when the vehicle 50 collides in the front or in the rear.

More specifically, in this embodiment, as shown in FIG. 4, the through hole 128a is, for example, a circular hole having a width w1 in the vehicle front-rear direction (the vehicle front direction Fr and the vehicle rear direction Rr shown in FIG. 3 and FIG. 4). The shaft portion 132 of the fastening member 130 is, for example, a round rod having a width w2 in the vehicle front-rear direction. The width w1 of the through hole 128a is larger than the width w2 of the shaft portion 132 of the fastening member 130. Further, since the slit 128b is open to the outside from the edge of the through hole 128a, it is preferable that a width w3 of the slit 128b in the vehicle front-rear direction is equivalent to the width w1 of the through hole 128a. That is, the slit 128b extends outwards from the semicircle (the largest diameter) of the through hole 128a, and the width w3 of the slit 128b is kept uniform in the vehicle front-rear direction. Accordingly, the width w3 (equivalent to the width w1) of the slit 128b in the vehicle front-rear direction is larger than the width w2 of the shaft portion 132 of the fastening member 130 inserted into the through hole 128a in the vehicle front-rear direction. The fastening member 130 may thus be easily detached to the outside in the vehicle width direction when the vehicle 50 collides in the front or in the rear.

Besides, in this embodiment, the slit 128b shown in FIG. 4 extends from the through hole 128a to the outside in the vehicle width direction in an extending direction D1 parallel to the vehicle width direction. However, in the variation examples shown in FIG. 5 and FIG. 6, the slit 128b may extend from the through hole 128a to the outside in the vehicle width direction in an extending direction D2 (shown in FIG. 5) or in an extending direction D3 (shown in FIG. 6) inclined towards the vehicle front-rear direction with respect to the vehicle width direction. The inclination towards the vehicle front-rear direction with respect to the vehicle width direction means that the extending directions D2 and D3 are not parallel to the vehicle width direction. However, when the inclination angle between the extending direction and the vehicle width direction differs by a certain angle or greater (e.g., 45 degrees), the extending direction is closer to the vehicle front-rear direction than the vehicle width direction, and the extending direction is not referred to as extending to the outside in the vehicle width direction.

It thus can be seen that in this embodiment, as long as the width w3 of the slit 128b in the vehicle front-rear direction is larger than the width w2 of the shaft portion 132 of the fastening member 130 in the vehicle front-rear direction, the relative relationship between the width w3 of the slit 128b in the vehicle front-rear direction and the width w1 of the through hole 128a in the vehicle front-rear direction is not limited in the disclosure. The width w3 of the slit 128b is also not limited to be kept uniform in the vehicle front-rear direction and may be adjusted according to needs. Further, the relative relationship between the extending direction of the slit 128b and the vehicle width direction is not limited in the disclosure and may be adjusted according to needs as long as the slit 128b can extend from the through hole 128a to the outside in the vehicle width direction.

In view of the foregoing, in the vehicle frame structure provided by the disclosure, the fixing portion at the upper end of the support frame and the lower end of the side frame are fixed to each other via the fastening member extending in the vehicle up-down direction. Further, the fixing portion has the slit formed towards the outside in the vehicle width direction from the through hole into which the fastening member is inserted. Preferably, the slit is configured so that the fastening member is able to be detached to the outside in the vehicle width direction when the vehicle collides in the front or in the rear. The width of the slit in the vehicle front-rear direction is larger than the width of the shaft portion of the fastening member inserted into the through hole in the vehicle front-rear direction. Further, the support frame and the fixing portion are integrally formed by casting. In this way, when the vehicle collides, the fastening member for fixing the support frame and the side frame can be displaced towards the outside in the vehicle width direction from the slit in the fixing portion. The support frame and the side frame are separated in the vehicle width direction, so an additional bracket is not required to be used to connect and fix the support frame and the side frame. The overall structural rigidity (especially in the vehicle up-down direction) is also improved. Accordingly, the vehicle frame structure provided by the disclosure can achieve light weight and cost reduction while maintaining good structural rigidity.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A vehicle frame structure, comprising:
a side frame disposed at a side portion of a vehicle and extending in a vehicle front-rear direction; and
a support frame disposed below the side frame to support a suspension member, wherein
the support frame comprises a body portion, an arm portion extending upwards from the body portion, and a fixing portion disposed on an upper end of the arm portion,
the fixing portion of the support frame and a lower end of the side frame are fixed to each other via a fastening member extending in a vehicle up-down direction, and
the fixing portion has a slit formed towards the outside in a vehicle width direction from a through hole into which the fastening member is inserted,
wherein the slit extends from the through hole to the outside in the vehicle width direction in an extending direction inclined towards the vehicle front-rear direction with respect to the vehicle width direction,
wherein a width of the slit in the vehicle front-rear direction is larger than a width of a shaft portion of the fastening member inserted into the through hole in the vehicle front-rear direction.

2. The vehicle frame structure according to claim 1, wherein
the slit is configured so that the fastening member is able to be detached to the outside in the vehicle width direction when the vehicle collides in the front or in the rear.

3. The vehicle frame structure according to claim 1, wherein
the support frame and the fixing portion are integrally formed by casting.

* * * * *